UNITED STATES PATENT OFFICE.

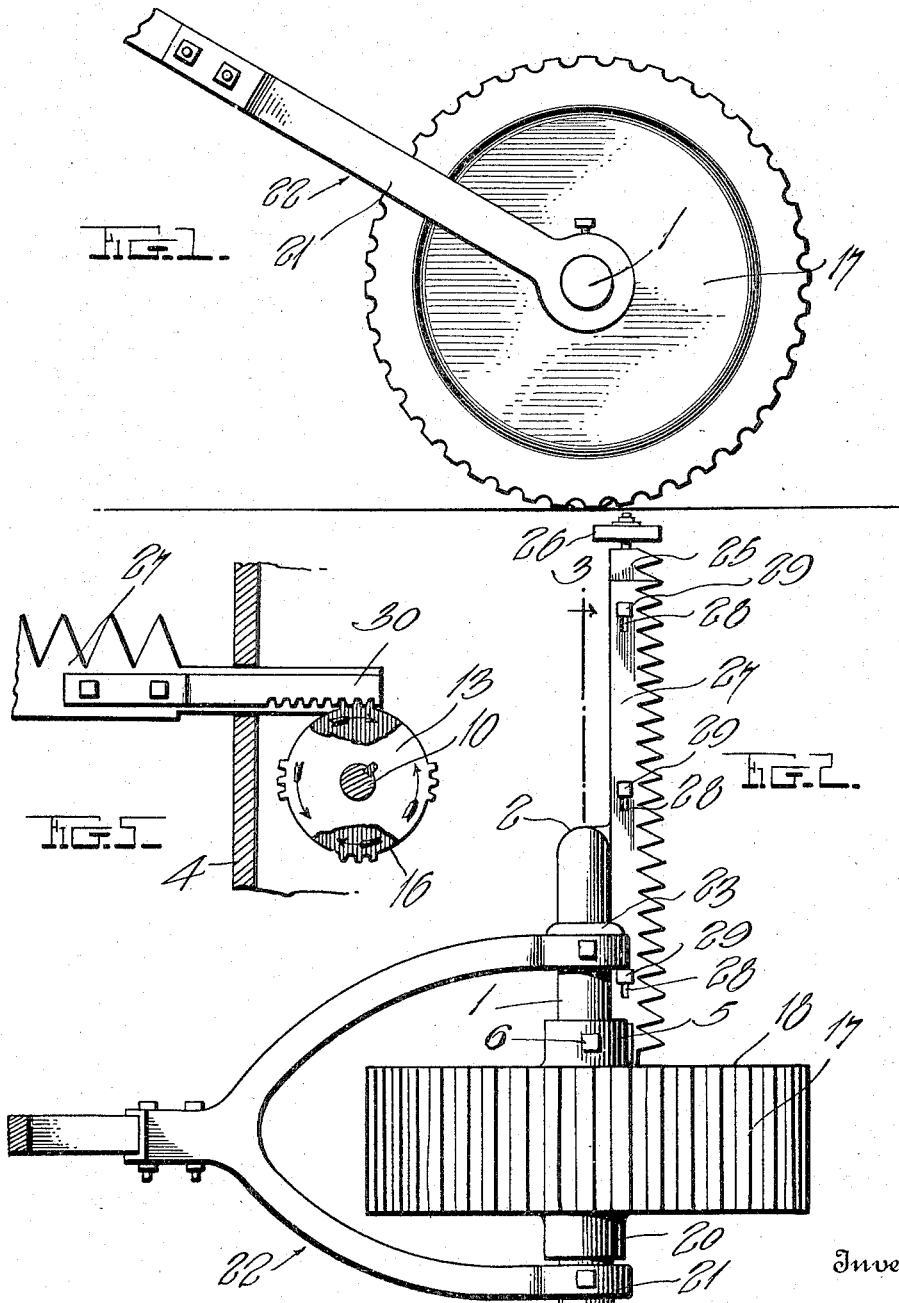

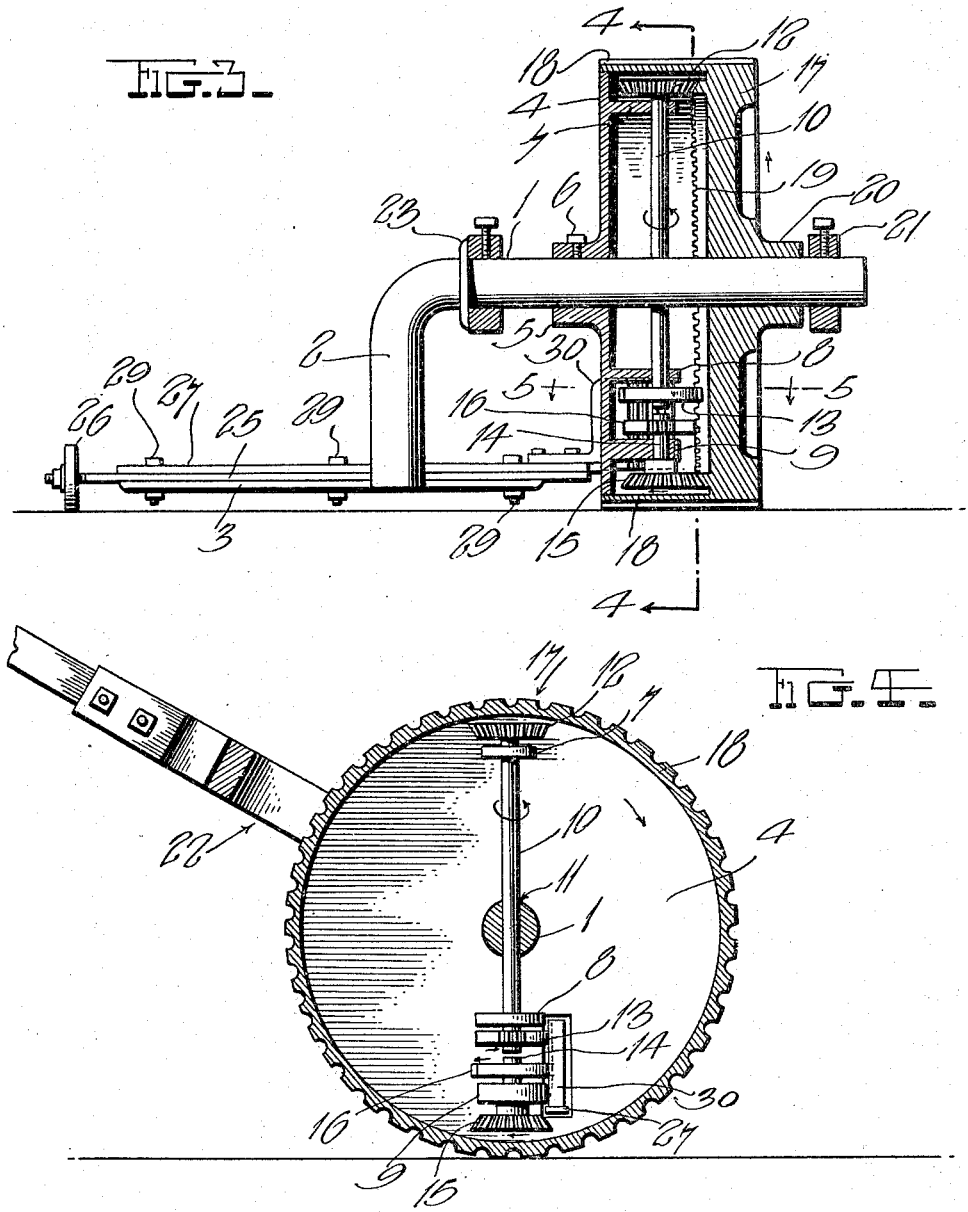

WALTER F. WELCH, OF JAMAICA, NEW YORK.

MOWING-MACHINE.

1,229,000.  Specification of Letters Patent.  Patented June 5, 1917.

Application filed September 21, 1916. Serial No. 121,449.

*To all whom it may concern:*

Be it known that I, WALTER F. WELCH, a citizen of the United States, residing at Jamaica, in the county of Queens and State of New York, have invented certain new and useful Improvements in Mowing-Machines; and I do declare the following to be a full, clear, and exact description of the invention, such as will enable others skilled in the art to which it appertains to make and use the same.

My invention aims to provide a simple and inexpensive yet highly efficient and durable mower operating on the sickle bar principle and having a novel arrangement of mutilated gears for alternate engagement with a rack on the moving sickle bar for reciprocating this bar.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a side elevation of the improved mower;

Fig. 2 is a top plan view;

Fig. 3 is a vertical section on the plane of the line 3—3 of Fig. 2;

Fig. 4 is an additional sectional view on the plane of the line 4—4 of Fig. 3; and Fig. 5 is a horizontal section on the plane of the line 5—5 of Fig. 3.

In specifically describing the structure shown in the drawings above briefly described, similar characters will be employed to designate corresponding parts throughout the several views and reference will be herein made to the numerous elements by their respective indices. To this end the numeral 1 designates a one-piece horizontal shaft having its inner end directed downwardly as indicated at 2 and equipped with a horizontal shoe plate 3 which extends transversely of the line of travel of the machine.

A disk 4 is provided with a hub 5 secured rigidly on the shaft 1 by means of a set screw or the like 6 the upper edge portion of said disk having a bearing 7 which projects toward the outer end of shaft 1 while the lower edge portion of said disk is provided with a pair of vertically spaced bearings 8 and 9, the former being disposed above the latter. A vertical operating shaft 10 is rotatably supported in the bearings 7 and 8 and passes through a bearing opening 11 in the shaft 1, the upper end of said shaft 10 having a driving pinion 12 while the lower end thereof is equipped with a mutilated gear 13 having two sets of teeth positioned diametrically opposite each other as shown.

A stub shaft 14 is mounted rotatably in the bearing 9 and is alined with shaft 10, the lower end of said stub shaft having a driving pinion 15 of the same size and shape as the pinion 12 while the upper end of said shaft is equipped with a mutilated gear 16 identical with the gear 13 and disposed in close proximity thereto.

A driving wheel 17 is rotatably mounted on the outer end of the shaft 1 and is equipped with an annular flange 18 which projects from its periphery and encircles the disk 4 to form a housing for the shafts 10 and 14 and the parts carried thereby. The wheel 17 is provided with a gear ring 19 meshing with the pinions 12 and 15, whereby said pinions will be driven in opposite directions to similarly drive the mutilated gears 13 and 16. The wheel 17 may be held against removal from the shaft 1 by any appropriate means but said wheel is preferably provided on its outer side with a hub 20 which abuts one arm 21 of a fork 22, which arm is secured on the outer end of said shaft. The fork 22 straddles the wheel 17 and the other arm thereof is adjustably secured by set screws or the like on the inner end of the shaft 1, being preferably disposed against a stop flange 23 which in most cases will be cast integrally with said shaft. A handle 24 extends from the fork 22 for moving the entire machine over the plot of ground from which the grass is to be mowed, that is, if the machine be hand operated. It is possible, however, that it may be constructed in larger sizes and drawn by horses.

A sickle bar 25 is secured rigidly to the upper side of the shoe plate 3 and projects beyond the outer end thereof, the outer end of said bar having thereon a roller 26 or other suitable shoe for engagement with the ground. Contacting slidably with the upper side of the sickle bar 25 is a second sickle bar 27, said bar having slots 28 through which bolts 29 pass to retain said bar in operative position. Ball or roller bearings (not shown) are preferably interposed between the two sickle bars 25 and 27 to allow easy operation of the latter but in some types of the machine, these bearings might well be omitted.

A rack 30 is carried by the inner end of the sickle bar 27 and projects slidably through an opening in the lower edge portion of the disk 4, said rack being adapted for successive engagement by the two mutilated gears 13 and 16, one of said gears serving to force the rack 30 in one direction and the other gear then immediately taking up the work to return said rack. It will thus be evident that as the machine is propelled over the ground, the bar 27 will be reciprocated, and the proper amount of reciprocation will be controlled by the size of the numerous driving gears and the spacing of the sets of teeth of the mutilated gears.

A machine constructed as or substantially as shown and described is simple and may therefore be manufactured and marketed at a minimum cost. Regardless of this, however, the mower will be highly efficient and durable.

In the foregoing, a number of specific details have been described for accomplishing probably the best results and in the accompanying drawings the same have been illustrated but it is to be understood that within the scope of the invention as claimed numerous changes may be made without sacrificing the principal advantages. For instance, instead of only one wheel and operating means therein for the moving sickle bar, two wheels may be used and the operating means in question may be duplicated in the second wheel.

I claim:

1. A mowing machine comprising a horizontal shaft having a downwardly directed inner end, superimposed fixed and movable cutters carried by said end, a disk secured on the shaft and having bearings projecting toward the outer end thereof, a pair of alined shafts rotatably mounted in said bearings and extending transversely in respect to the other shaft, driving pinions on the outer ends of said alined shafts, mutilated gears on the inner ends thereof, a rack bar carried by the inner end of the movable cutter and adapted to be alternately engaged by said mutilated gears, and a driving wheel rotatably mounted on the shaft and having a gear ring meshing with said driving pinions.

2. A mowing machine comprising a horizontal shaft having a downwardly directed inner end, superimposed fixed and movable cutters carried by said end, a disk secured on the shaft and having upper and lower bearings projecting toward the outer end thereof, said shaft having a bearing opening alined with said bearings, an operating shaft passing through said bearings and said opening, a driving pinion on the upper end of said shaft and a mutilated gear on the lower end thereof, an additional bearing projecting from the lower portion of the disk toward the outer end of the first named shaft, a stub shaft rotatably mounted in said additional bearing and alined with said operating shaft, a driving pinion on the lower end of said stub shaft, and a mutilated gear on the upper end thereof, a rack carried by the inner end of the movable cutter and adapted to be alternately engaged by the two mutilated gears, and a driving wheel rotatably mounted on the shaft and having a gear ring meshing with the two driving pinions.

3. A mowing machine comprising a horizontal shaft having a downwardly directed inner end equipped on its lower terminal with an elongated shoe plate extending transversely of the line of travel of the machine, superimposed fixed and movable cutters mounted on said shoe plate, a wheel rotatably mounted on the horizontal portion of the shaft, and driving connections between said wheel and the movable cutter for reciprocating the latter.

4. A mowing machine comprising fixed and movable sickle bars coöperating with each other, a rack carried by one end of the movable sickle bar, a pair of alined shafts having mutilated gears on one end for alternate engagement with said rack to reciprocate said movable sickle bar, pinions on the other ends of said alined shafts, and a driving wheel having a gear ring meshing at diametrically opposite points with said pinions for simultaneously driving them in opposite directions.

5. A mowing machine comprising a wheel supported structure, a fixed and a movable sickle bar carried thereby, a rack bar secured to the movable sickle bar and having teeth on one side, a pair of mutilated gears for alternate engagement with said teeth to reciprocate the movable sickle bar, and means operable from one or more wheels of the aforesaid structure for simultaneously driving both gears in opposite directions.

In testimony whereof I have hereunto set my hand in the presence of two subscribing witnesses.

WALTER F. WELCH.

Witnesses:
 VINCENT P. DONIHEE,
 FRANK F. GEARN.